(12) United States Patent
Zhu et al.

(10) Patent No.: US 7,574,662 B1
(45) Date of Patent: Aug. 11, 2009

(54) REMOTE DOCUMENT SHARING

(75) Inventors: Min Zhu, Los Altos Hills, CA (US);
Guanghong Yang, Mountain View, CA (US); Zheng Yuan, San Jose, CA (US); Song Xiang Wei, Mountainview, CA (US)

(73) Assignee: Cisco Technology, Inc., San Jose, CA (US)

( * ) Notice: Subject to any disclaimer, the term of this patent is extended or adjusted under 35 U.S.C. 154(b) by 249 days.

(21) Appl. No.: 10/873,392

(22) Filed: Jun. 21, 2004

Related U.S. Application Data

(62) Division of application No. 09/591,377, filed on Jun. 9, 2000, now Pat. No. 6,763,501.

(51) Int. Cl.
*G06F 17/00* (2006.01)

(52) U.S. Cl. .................. 715/753; 709/204; 707/201

(58) Field of Classification Search ............ 715/530, 715/745, 753, 788, 255; 705/2; 707/201; 709/204; 358/1.14, 1, 1.15, 14; 711/171
See application file for complete search history.

(56) References Cited

U.S. PATENT DOCUMENTS

| | | | | | |
|---|---|---|---|---|---|
| 5,051,926 | A | * | 9/1991 | Stevens et al. | 358/1.14 |
| 5,408,600 | A | * | 4/1995 | Garfinkel et al. | 715/759 |
| 5,577,188 | A | * | 11/1996 | Zhu | 715/745 |
| 5,678,002 | A | * | 10/1997 | Fawcett et al. | 715/709 |
| 5,694,544 | A | * | 12/1997 | Tanigawa et al. | 715/753 |
| 5,732,219 | A | * | 3/1998 | Blumer et al. | 709/227 |
| 5,903,716 | A | * | 5/1999 | Kimber et al. | 358/1.13 |
| 5,991,760 | A | * | 11/1999 | Gauvin et al. | 707/10 |
| 6,119,137 | A | * | 9/2000 | Smith et al. | 715/523 |
| 6,130,760 | A | * | 10/2000 | Nickerson | 358/442 |
| 6,141,737 | A | * | 10/2000 | Krantz et al. | 711/171 |
| 6,144,991 | A | * | 11/2000 | England | 709/205 |
| 6,167,432 | A | * | 12/2000 | Jiang | 709/204 |
| 6,185,683 | B1 | * | 2/2001 | Ginter et al. | 713/176 |
| 6,260,160 | B1 | * | 7/2001 | Beyda et al. | 714/27 |
| 6,266,150 | B1 | * | 7/2001 | Brossman et al. | 358/1.15 |
| 6,307,570 | B1 | * | 10/2001 | Stergiades | 715/744 |
| 6,343,313 | B1 | * | 1/2002 | Salesky et al. | 709/204 |
| 6,411,965 | B2 | * | 6/2002 | Klug | 707/201 |
| 6,466,328 | B1 | * | 10/2002 | Bradley et al. | 358/1.15 |
| 6,538,667 | B1 | * | 3/2003 | Duursma et al. | 715/740 |
| 6,598,087 | B1 | * | 7/2003 | Dixon et al. | 709/236 |
| 6,601,087 | B1 | * | 7/2003 | Zhu et al. | 709/205 |
| 6,608,636 | B1 | * | 8/2003 | Roseman | 715/753 |
| 6,629,129 | B1 | | 9/2003 | Bookspan et al. | |
| 6,654,032 | B1 | * | 11/2003 | Zhu et al. | 715/753 |
| 6,691,154 | B1 | * | 2/2004 | Zhu et al. | 709/204 |
| 6,704,117 | B1 | * | 3/2004 | Chintakrindi et al. | 358/1.15 |
| 6,710,790 | B1 | * | 3/2004 | Fagioli | 715/802 |
| 6,725,238 | B1 | * | 4/2004 | Auvenshine | 707/200 |

(Continued)

*Primary Examiner*—Doug Hutton
*Assistant Examiner*—James H Blackwell
(74) *Attorney, Agent, or Firm*—Cesari and McKenna LLP

(57) ABSTRACT

An apparatus, method, and computer program product for instant remote document serving. In one implementation, referred to as "remote document serving," a remote file is converted to a "served document" which is distributed to a member of a data conference for review. In another implementation, referred to as "remote application serving," the "owner" of a remote document views the screens created by a remote application associated with the document. The owner can view the screens and interact with the remote application.

8 Claims, 12 Drawing Sheets

U.S. PATENT DOCUMENTS

| | | | |
|---|---|---|---|
| 6,763,501 B1 * | 7/2004 | Zhu et al. | 715/530 |
| 6,785,894 B1 * | 8/2004 | Ruberg | 719/321 |
| 6,938,042 B2 * | 8/2005 | Aboulhosn et al. | 707/10 |
| 7,043,697 B1 * | 5/2006 | Jensen et al. | 715/788 |
| 2002/0120792 A1 * | 8/2002 | Blair et al. | 709/330 |
| 2003/0184800 A1 * | 10/2003 | Ohara | 358/1.15 |

* cited by examiner

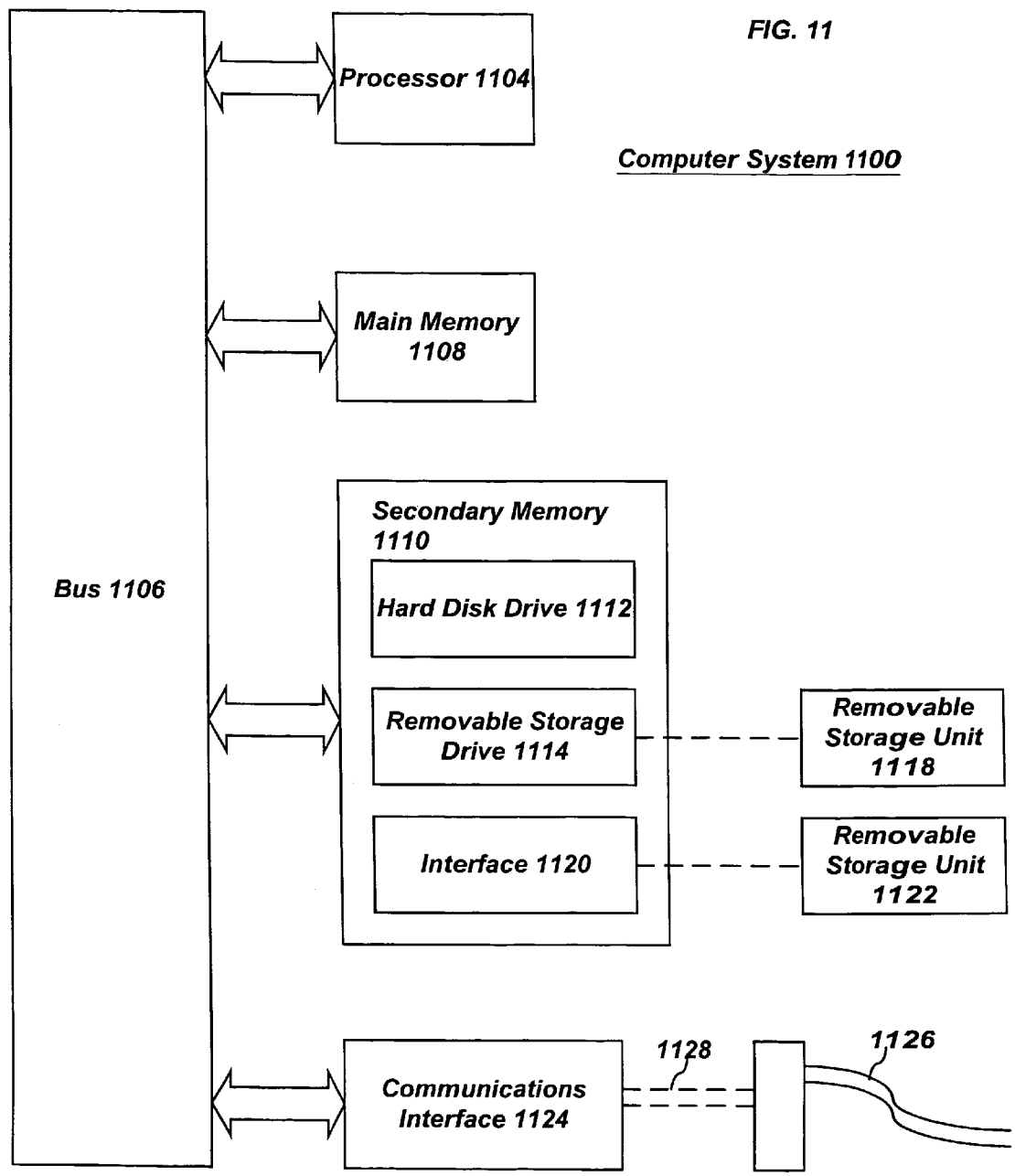

REMOTE DOCUMENT SHARING

CROSS-REFERENCE TO RELATED APPLICATIONS

This application is a divisional application of and claims priority to U.S. application Ser. No. 09/591,377, filed on Jun. 9, 2000, now U.S. Pat. No. 6,763,501 the entire contents of which are incorporated by reference herein.

BACKGROUND OF THE INVENTION

1. Field of the Invention

The present invention relates generally to serving a document to one or more clients from a remote server.

2. Related Art

Today, in any organization, a wide range of computer applications are used by individual users to perform the tasks and duties associated with their responsibilities. These users can be employees, suppliers, vendors, or customers. These applications range from simple desktop applications like Word, Excel, Powerpoint, to sophisticated server-based applications requiring specialized hardware and software like Oracle, Autocad, Spice, Nastran. Applications enable organizations to increase productivity in a number of ways. They can lead to revenue generation, better services, and increased levels of user knowledge.

Each application has to be installed on client systems. It has to be licensed on the client. For different applications, customized hardware may be required. In addition, different applications require different operating systems. Thus a user of a client system having a Windows operating system running on a single processor may wish to use an application requiring a Unix operating system with multiple processors. Further, users are geographically dispersed and have access to different client environments within the home or office.

In addition, the data and documents associated with an application can be dispersed at different locations. Getting the document from one location to another location and back becomes another tedious and time-consuming task.

An additional complication in many cases is that each person is required to have their own copy (usually an identical copy) of the document editing program (e.g., Browser, the spreadsheet application, the word processing program, the image editing program, etc) required to view, create or modify the document. This is not only expensive in many cases, but also requires additional effort to install, maintain, and update the document editing programs on individual computer systems, referred to here as client computer systems.

One alternative method to this process is to travel to the remote location where the remote document or application is stored/served and perform the task of viewing or using the application to get the work done. The shortcoming with this method is that there may be significant travel time and travel cost in getting the user to the remote location. There may be an additional restriction that the "right" location is constrained to be the location with access to the "correct" document editing program.

There are significant costs in physically locating applications in a distributed environment, in choice of where the application executes—on the server, on the client or on some distributed combination. There are additional costs associated with the relative location of the data and the client and the means of connectivity.

Thus, it is highly desirable to have ubiquitous access to the applications and the data by providing a means for central document storage, and central application storing/serving.

A partial solution to this problem is provided by the Citrix Independent Computing Architecture http://www.citrix.com/products/ica.asp. In this method, the clients initially interface with a Citrix server. The Citrix server then determines the available server running Windows NT for serving the application and then enables the client to connect directly with the Windows NT server. At this point, the Citrix server is no longer necessary. The limitation of this solution is that once the application is invoked on the application server, the client communicates directly with the application server and bypasses the Citrix server. So the solution then degrades to a peer-to-peer architecture model, and the advantages of the client-server architecture are lost. Also this solution is limited to applications running the Windows operating system.

SUMMARY OF THE INVENTION

The present invention features an apparatus, method, and computer program product for instant serving of a remote document and or application. In one implementation, referred to as "remote document serving," a file located on a remote application server is converted to a "served document" which is distributed to the user for review. The method of this implementation includes printing the file, on the application server, to a virtual printer from an application associate with the file, thereby creating a served document; and sending the served document to a remote client, whereby the served document is displaced at the remote client by a viewer application.

In another implementation, referred to as "remote application serving," the "owner" of a remote document views and controls the screens created by an application located on a remote application server, where the document is associated with the application. The owner of the application serving session can view the screens and interact with the application. The method of this implementation includes invoking the application on a remote application server computer, generating an application screen. The application screen is sent to a virtual device, creating a virtual screen. The virtual screen is sent to a conferencing server for distribution to the remote computer used by the owner of the application serving session where the virtual screen is displayed by a viewer application. The owner can interact with the application. The owner edits the served screen, thereby generating user input that is sent to the conferencing server, which in turn sends the user input to the application server computer. The user input drives the application to edit the application screen based on the user input. In response, the application provides an application screen update. The application screen update is sent to the virtual device, thereby creating a virtual screen update. The virtual screen update is sent to the conferencing server for distribution to the remote computer, thereby updating the display of the application screen by the viewer application.

In all implementations, an annotation mode is available, where a transparent window is displayed over the served document. The owner can create objects to be displayed in the transparent window, thereby annotating the document.

One advantage of the present invention is that, by serving documents and applications in a client-server system, it provides robust, scalable, instant serving of remote documents and applications.

Another advantage of the present invention is that a document can be served to clients without distributing the original full-featured document to those clients. Thus a client cannot present a modified copy of the document as an original.

Another advantage of the present invention is that it permits clients to use an application without permitting them to copy that application. Thus, clients can be billed for the use of the application on a per-use basis. Other centralized administrative services can be provided such as logging of usage, and access control.

Yet another advantage of the present invention is that it allows ubiquitous access to applications from any client, independent of the choice of operating system. Thus a client computer can be running a Windows, Macintosh, or Unix operating system and can access documents and applications from computers running any of Unix, Windows, and Macintosh operating systems.

Another advantage of the present invention is that by isolating the client from the application server, security of the data is maintained and better fault-tolerance is provided. Thus, if a server containing the application fails for some reason, the same application can be served from another server without any changes to the client environment. Also applications, other services, documents, and capacity can all be added with ease and without affecting the client environment.

Further features and advantages of the present invention as well as the structure and operation of various implementations of the present invention are described in detail below with reference to the accompanying drawings.

BRIEF DESCRIPTION OF THE DRAWINGS

The present invention will be described with reference to the accompanying drawings.

FIG. 11 depicts an example computer system capable of carrying out the functionality of the present invention.

DESCRIPTION OF THE PREFERRED IMPLEMENTATIONS

The present invention is described in terms of the above example. This is for convenience only and is not intended to limit the application of the present invention. In fact, after reading the following description, it will be apparent to one skilled in the relevant art how to implement the present invention in alternative implementations.

Introduction

Figure 1:
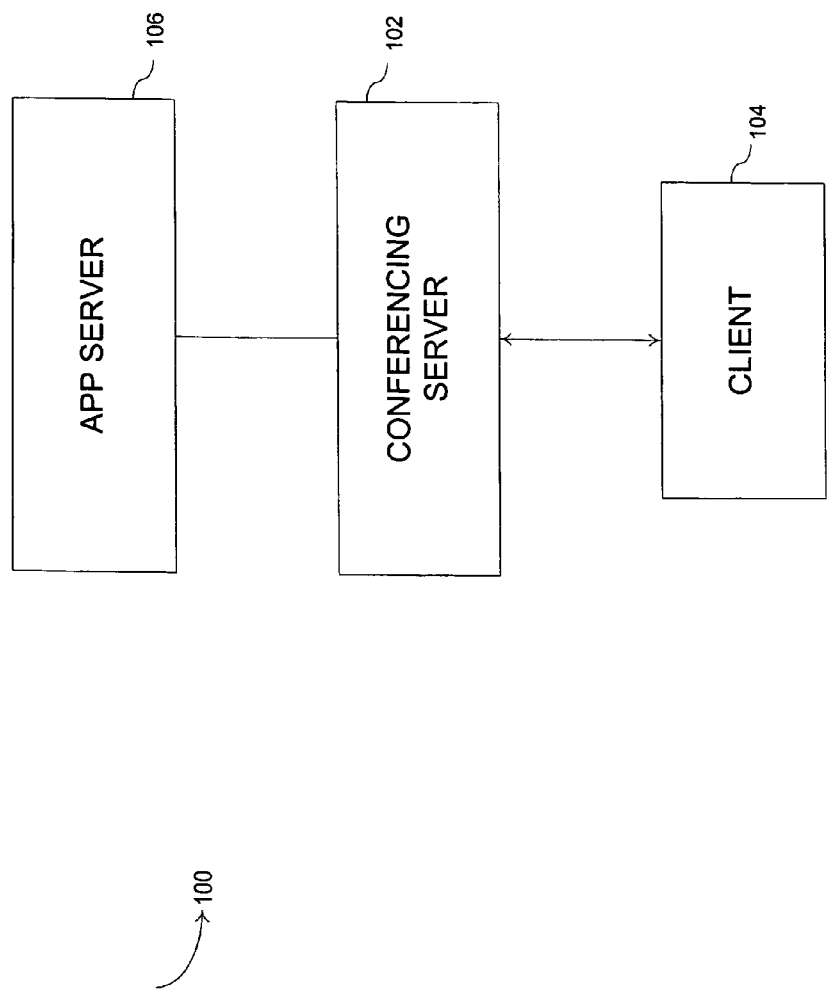
FIG. 1 depicts an example client-server system in which the present invention may be used.

FIG. 1 depicts an example client-server system 100 in which the present invention may be used. System 100 includes a conferencing server 102, an application server 106, and a client 104. The present invention is usually invoked after a data conference between the client and the server has been established. Methods for establishing data conferences between a client and a server are well known in the relevant arts.

Implementations of the present invention provide three modes to support different kinds of document serving: remote document serving mode, remote application serving mode, and annotation mode. In each mode, a remote document is served to a client.

Figure 2:
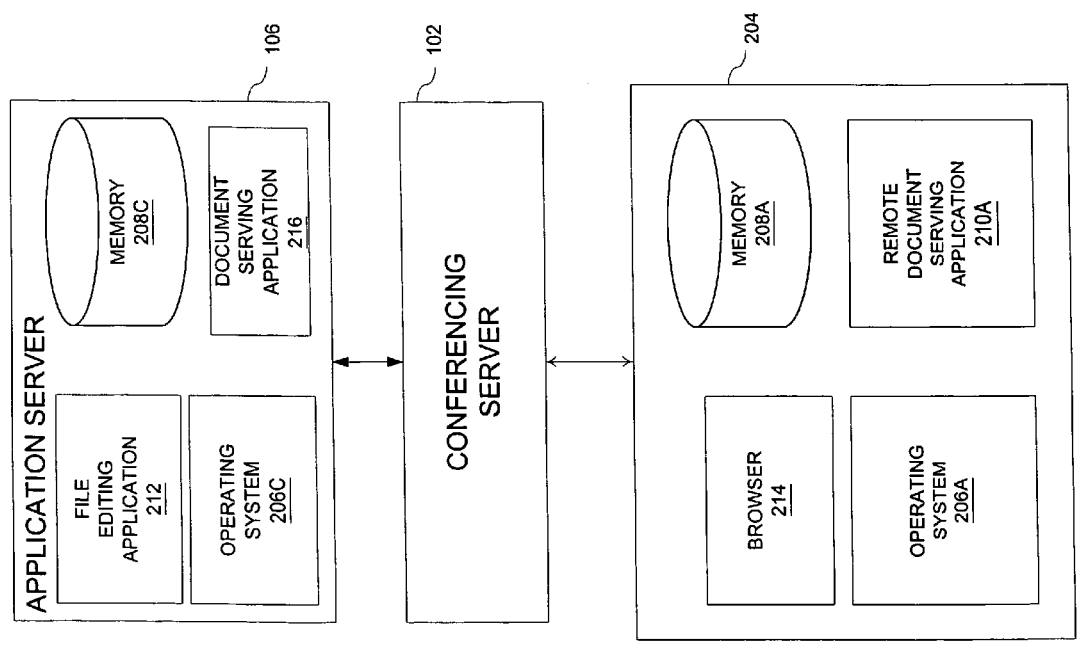
FIG. 2 depicts a client engaged in a document serving session using a conferencing server and an application server.

FIG. 2 depicts a client 204 using a conferencing server 102 and an application server 106. One key advantage of using client-server architecture rather than peer-to-peer architecture is each client merely communicates with the conferencing server. This advantage permits the system to be highly scalable, for example, to serve different applications to a large number of clients. Another advantage is that each application server communicates with the conferencing server only. Thus clients are exposed to a common interface to the conferencing server from which they can access different applications. Each of these applications could potentially be served from a separate server. This provides advantages in terms of access, maintenance, security, and accounting, and resource management.

Referring to FIG. 2, a client includes an operating system 206, such as Windows, a memory 208, and a document serving application 210. Application server 106 includes a file editing application 212 that is associated with the document to be served. For example, the file editing application can be Microsoft Word, and the document to be served can be a Microsoft Word document.

Figure 3:
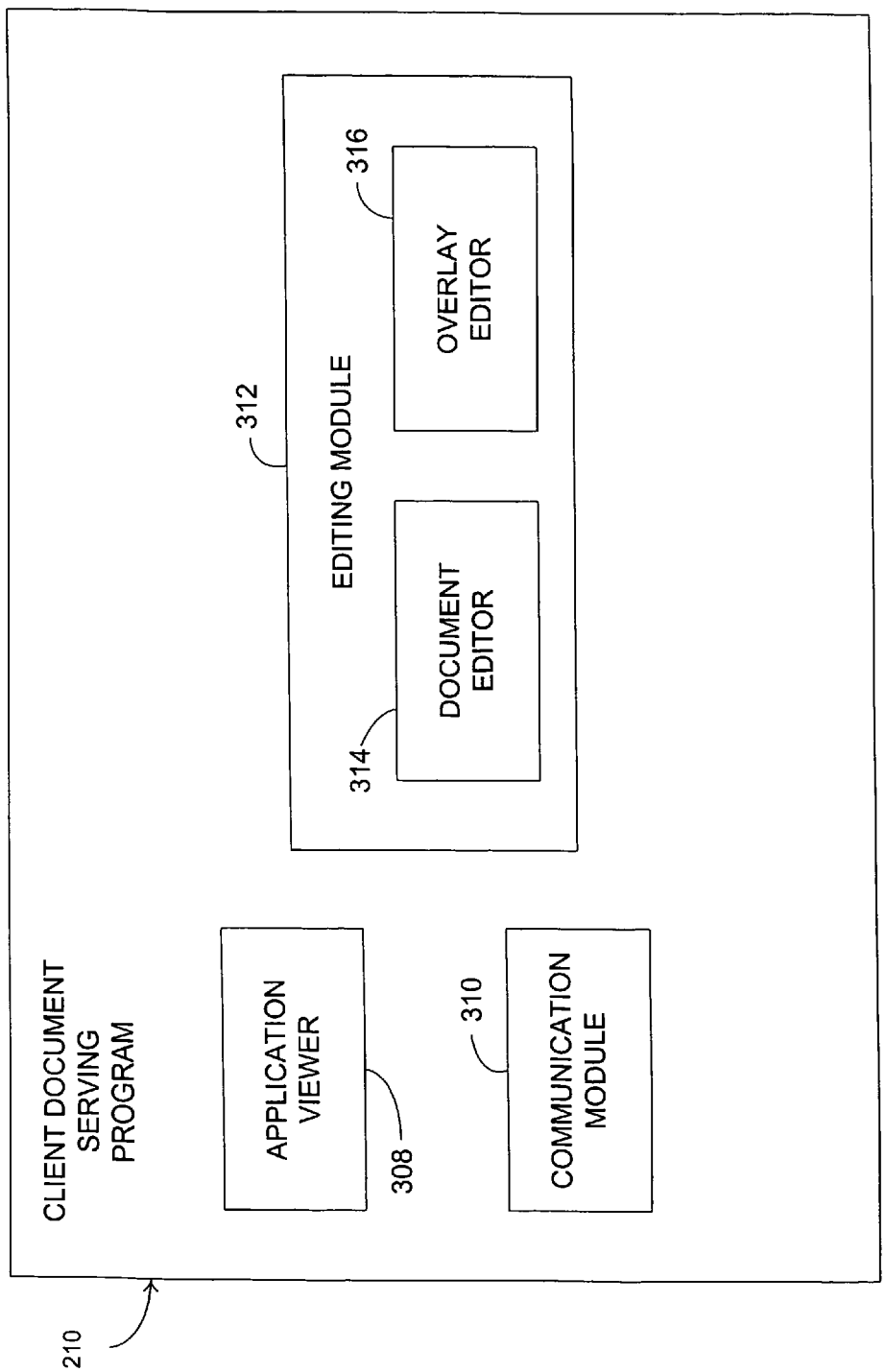
FIG. 3 is a block diagram of a client document serving application according to an implementation of the present invention.

FIG. 3 is a block diagram of client document serving application 210 according to an implementation of the present invention. In an implementation, client document serving application 210 is configured as a browser plug-in that can be downloaded from the Internet and installed on a computer running a Windows-type operating system and browser such as Internet Explorer.

Client document serving application 210 includes an application viewer 308, a communication module 310, and an editing module 312. Editing module 312 includes a document editor 314 and an overlay editor 316. The functions of these elements will be described in greater detail below.

Figure 4:
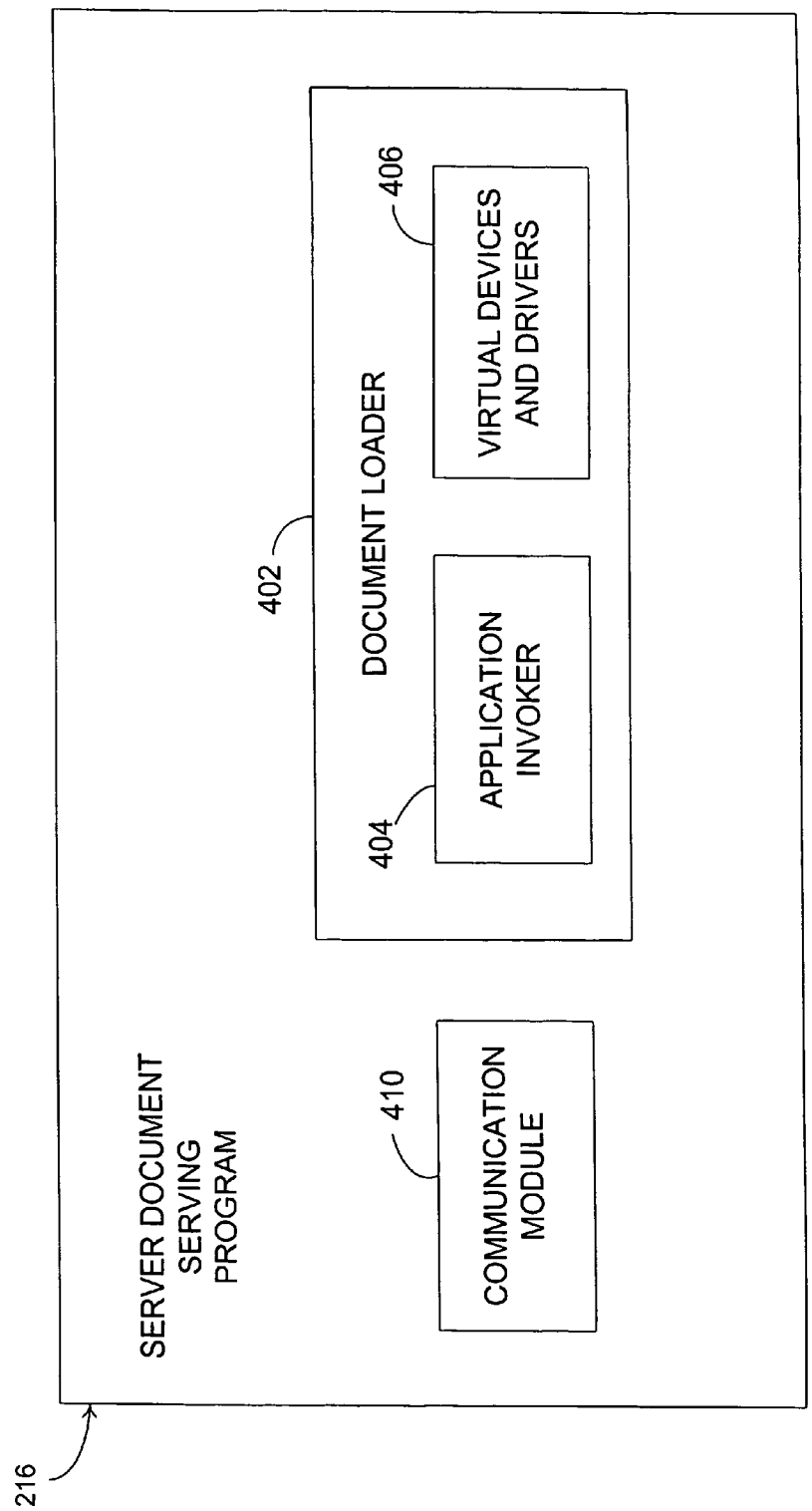
FIG. 4 is a block diagram of a server document serving application according to an implementation of the present invention.

FIG. 4 is a block diagram of server document serving application 216 according to an implementation of the present invention. Server document serving application 216 is a software program executing on a computer running a Windows-type operating system.

In order to serve a remote document, document serving application 216 first converts the document to another form by "loading" the document, as will be discussed in detail below. Therefore, the document serving application 216 includes document loader 402. Depending on the serving mode, document loading may involve invoking an application associated with the document. Accordingly, document loader 402 includes an application invoker 404. The present invention also uses virtual devices and drivers in document loading. Accordingly, document loader 402 includes virtual devices and drivers 406. Application server 106 serves a loaded document by transmitting data to the client, and receiving input data, using communication module 410.

Referring to FIG. 3, when a loaded document is received by a client 204, a viewer application 408 allows a user to view the document. Methods for exchanging such data are discussed extensively in U.S. Pat. No. 5,623,603 assigned to the assignee of the present application, and the disclosure thereof incorporated herein by reference in its entirety.

Editing module 412 enables a client to perform editing functions. Document editor 414 allows users to edit a served document. Overlay editor 416 allows users to edit the transparent overlay screen. Annotating the transparent window and sending data representing the annotations to a remote computer, where the annotations are drawn on the display, is discussed extensively in U.S. Pat. No. 5,577,188, assigned to the assignee of the present application, and the disclosure thereof incorporated herein by reference in its entirety.

Structured System-Programming Environment

Figure 5:
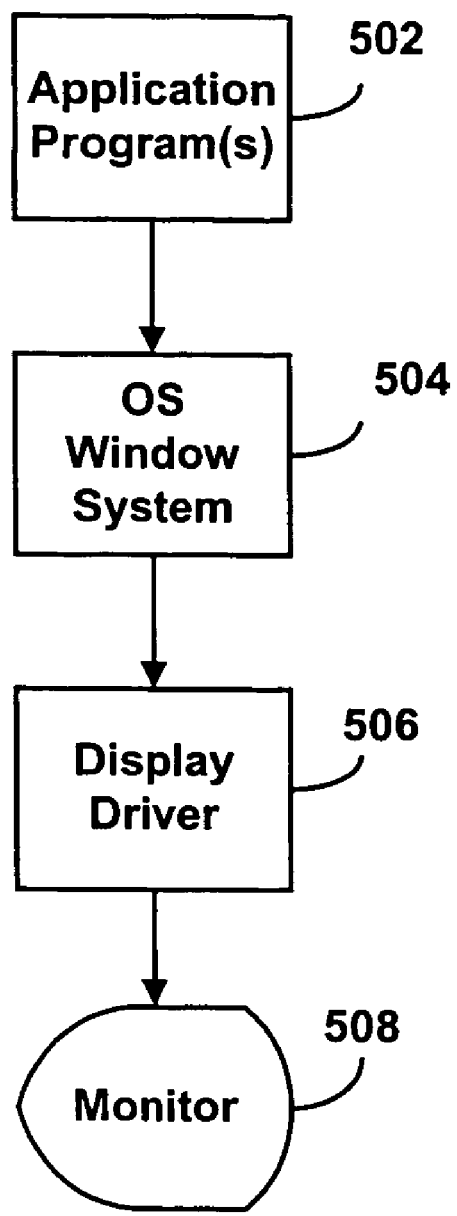
FIG. 5 depicts the software layers in a structured system environment.
Figure 6:
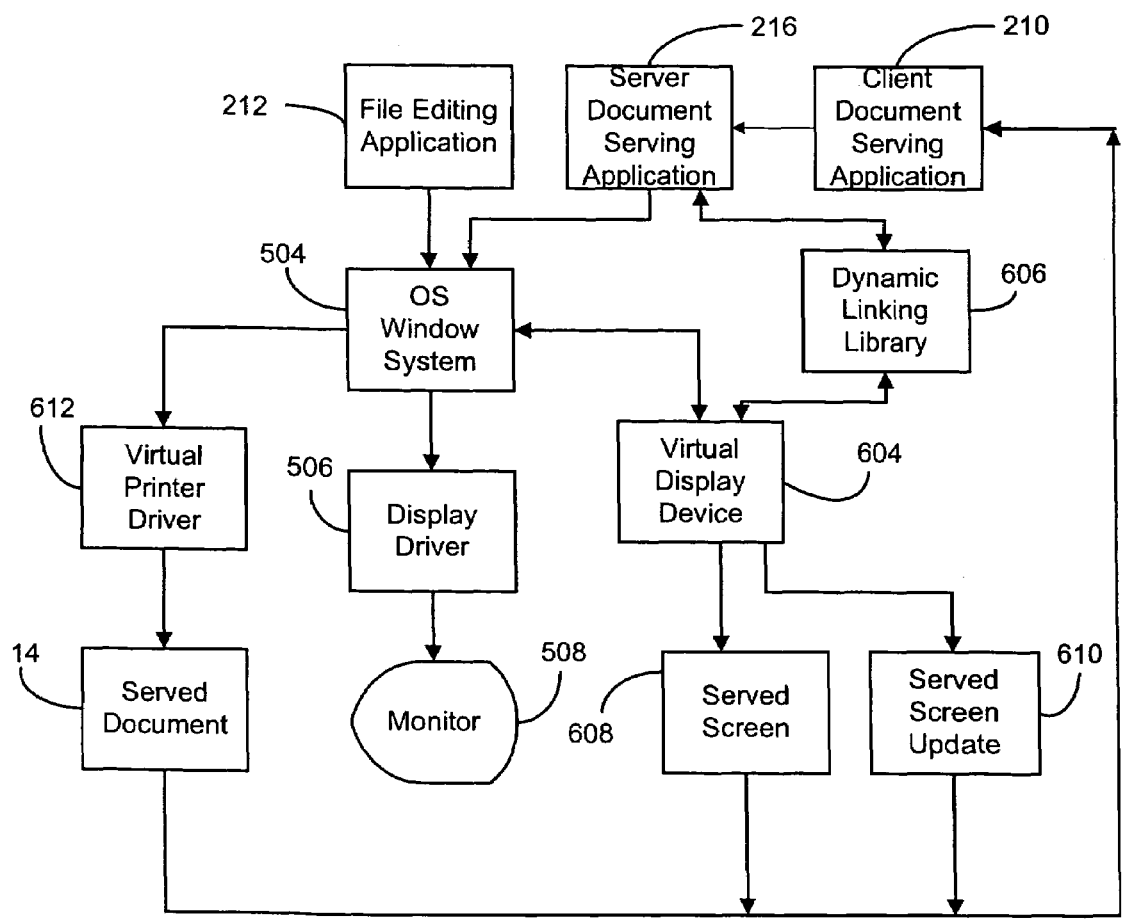
FIG. 6 depicts the software layers in a structured system environment as modified by an implementation of the present invention.

Before proceeding to a discussion of methods of document serving, the software layers in a structured system-programming environment such as Microsoft Windows are explained. Referring to FIGS. 5 and 6, in starting the server document serving application 216, the software layers in a structured system-programming environment are modified.

FIG. 5 depicts the software layers in a structured system environment. In this environment, a running application program 502 interfaces with input and output devices strictly through the operating system's Window system environment, represented by OS Window system 504. When the application program requests the OS Window system to write a character to the screen, the OS Window system in turn directs a display driver 506 to write the character to the monitor 508. A driver such as a display driver is a software program written specifically to handle a specific device or device type, such as monitor 508. For example, there are several standards of display resolution with computer monitors. A display driver is needed for each standard in order to control and interface with each type of monitor.

Display driver 506 tells the monitor 508 specifically how to write a character on the screen. For example, in an application program such as a word processor running on top of OS Window system 504, when the user inputs a character "a" from the keyboard and when the word processor receives the character "a" as input, the word processor will display the character "a" on the screen at the right place to reassure the user that he or she has input a character "a". To write the character "a" to the screen, the word processor calls an OS Window system 504 write-to-screen routine, specifying the character "a" and the location on the screen to place the character. The OS Window system 504 routine in turn calls the display driver with the given information, and the display driver specifically tells the computer screen the placement of dots on the screen to compose the visual image resembling the character "a".

In activating server document serving application 216, referring to FIG. 6, the software layer structure is modified. The application call to OS Window system 504 is redirected to a virtual display device 604. Virtual display device 604 is one of the virtual devices and drivers 406 within document loader 402.

In one implementation, redirection of the application calls to OS Window system is accomplished by renaming the appropriate OS Window System calls with predefined alternate calls and naming the virtual display device to the OS Window system's original calls. When the application calls the OS Window System via its name, it is calling the virtual display device rather than the OS Window System. The virtual display device calls the OS Window system through its predefined names. The virtual display device calls the OS Window system with the information to place on the screen as requested by a file editing application 212, which can be any application such as a word processor.

In one implementation, virtual display driver 604 reports the screen updates to server document serving application 216, via dynamic link library 606. When the screen updates are finished, server document serving application 216 reads the screen updates stored in dynamic link library 606. In annotation mode, client document serving application 210 checks for overlapping screen objects and re-draws the annotation objects if necessary. This process is fully explained in U.S. Pat. No. 5,577,188.

In another implementation, server document serving application 216 creates a served screen 608, or a served screen update 610, which is passed directly (via conferencing server 102) to client document serving application 210 for display. This implementation is used in the application serving mode, as described in detail below.

In document serving mode, a representation of the entire document is sent to the client's viewer application 308. In one implementation, this is accomplished by using a virtual printer driver 612, rather than a virtual display driver. The document to be served is printed from its associated file editing application 212 to virtual printer driver 612, creating a served document 614 in a predefined format. Served document 614 is passed directly (via conferencing server 102) to client document serving application 210 for display.

Remote Document Serving Mode

Figure 7:
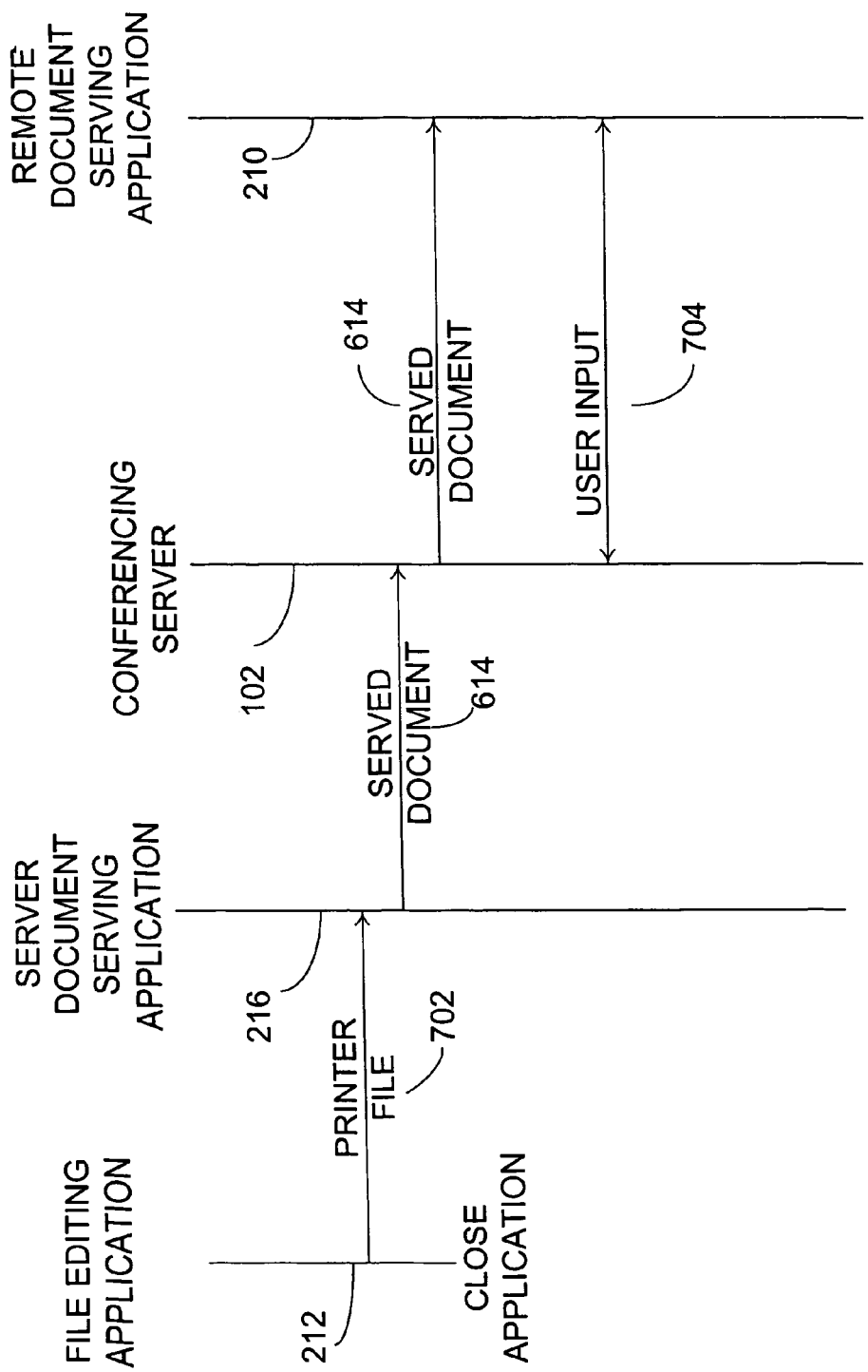
FIG. 7 is a flow diagram depicting the operation of remote document serving mode according to an implementation of the present invention FIG. 8 constitutes a flowchart depicting the operation of remote document serving mode according to an implementation of the present invention.
Figure 8:
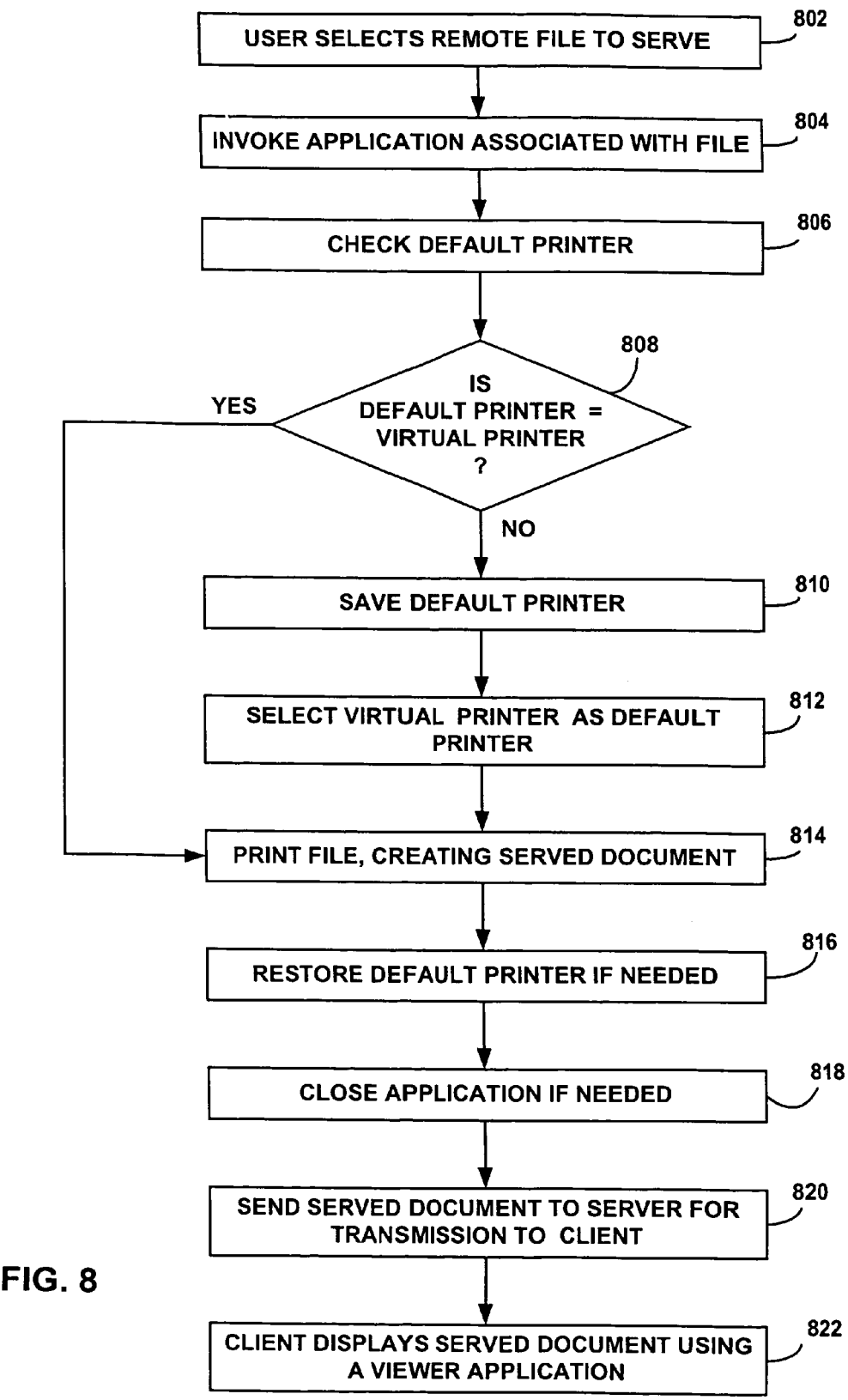

FIG. 7 is a flow diagram depicting the operation of document serving mode according to an implementation of the present invention. FIG. 7 depicts the data flows between file editing application 212, server document serving application 216 running on application server 106 and client document serving application 210 running on client 204. FIG. 8 is a flowchart depicting this operation.

Referring to FIG. 8, the user of owner client 204 selects a remote file to serve in step 802. In response, the application invoker of server document serving application 216 invokes the file editing application 212 associated with the selected file in step 804. In one implementation, the application invoker employs automatic application association to select the associated file editing application based on associations established by the operating system according to methods well-known in the relevant arts. If the file editing application is already running, step 804 merely involves opening the selected file using the associated file editing application. However, if the file editing application is not open when the file is selected, the file editing application is launched first.

The default printer associated with file editing application 212 or Windows is checked in step 806. If the default printer is not set to be the virtual printer associated with virtual printer driver 612, then the default printer is saved in step 810 and the virtual printer is selected as the default printer in step 812. Otherwise, steps 810 and 812 are skipped.

The selected file is then printed to the virtual printer in step 814. Referring to FIG. 6, this operation entails redirecting the print call from file editing application 212 at the OS Window System 504 to virtual printer driver 612, thereby creating served document 614. Served document 614 is then passed to client document serving application 210 for viewing. If necessary, the default printer is restored in step 816. If file editing application 212 was launched in step 804, then it is closed in step 818.

Client document serving application 210, on receipt of served document 614, sends the served document to server 102 for transmission to the client in the data conference. The client then displays the served document using viewer application 308, as shown in step 822.

In FIG. 7, time flows from top to bottom. Referring to that figure, virtual printer driver 612 generates printer file 702, which is modified by server document serving application 216 to create a served document 614. Server document serving application 216 forwards it to conferencing server 102 for distribution to remote document serving application 210 for display. Using annotation mode, the remote document serving application 210 can transfer user input 704 through conferencing server 102 to draw various objects upon a transparent window overlaying the served document 614.

Application Serving Mode

Figure 9:
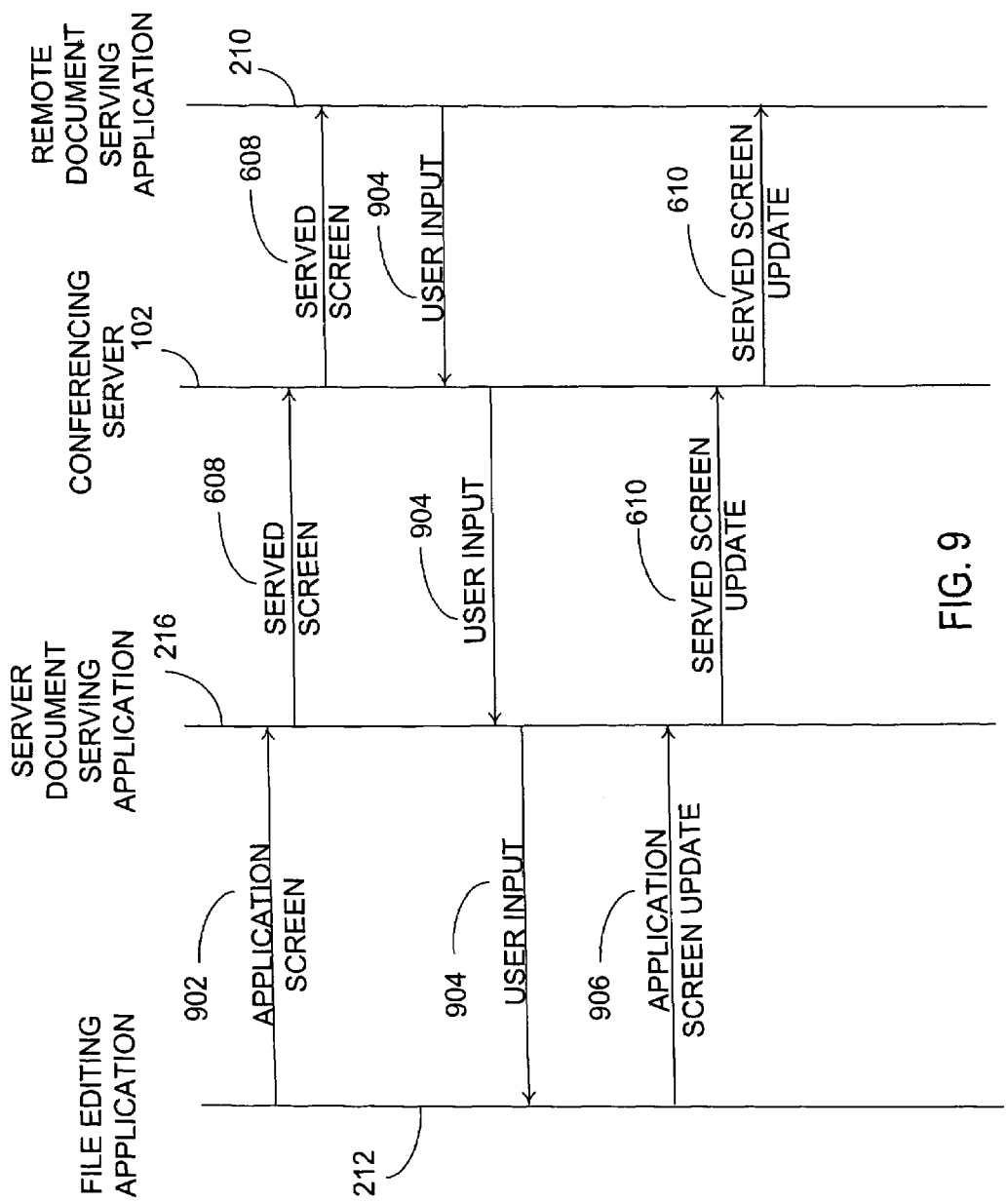
FIG. 9 is a flow diagram depicting the operation of remote application serving mode according to an implementation of the present invention.
Figure 10A:
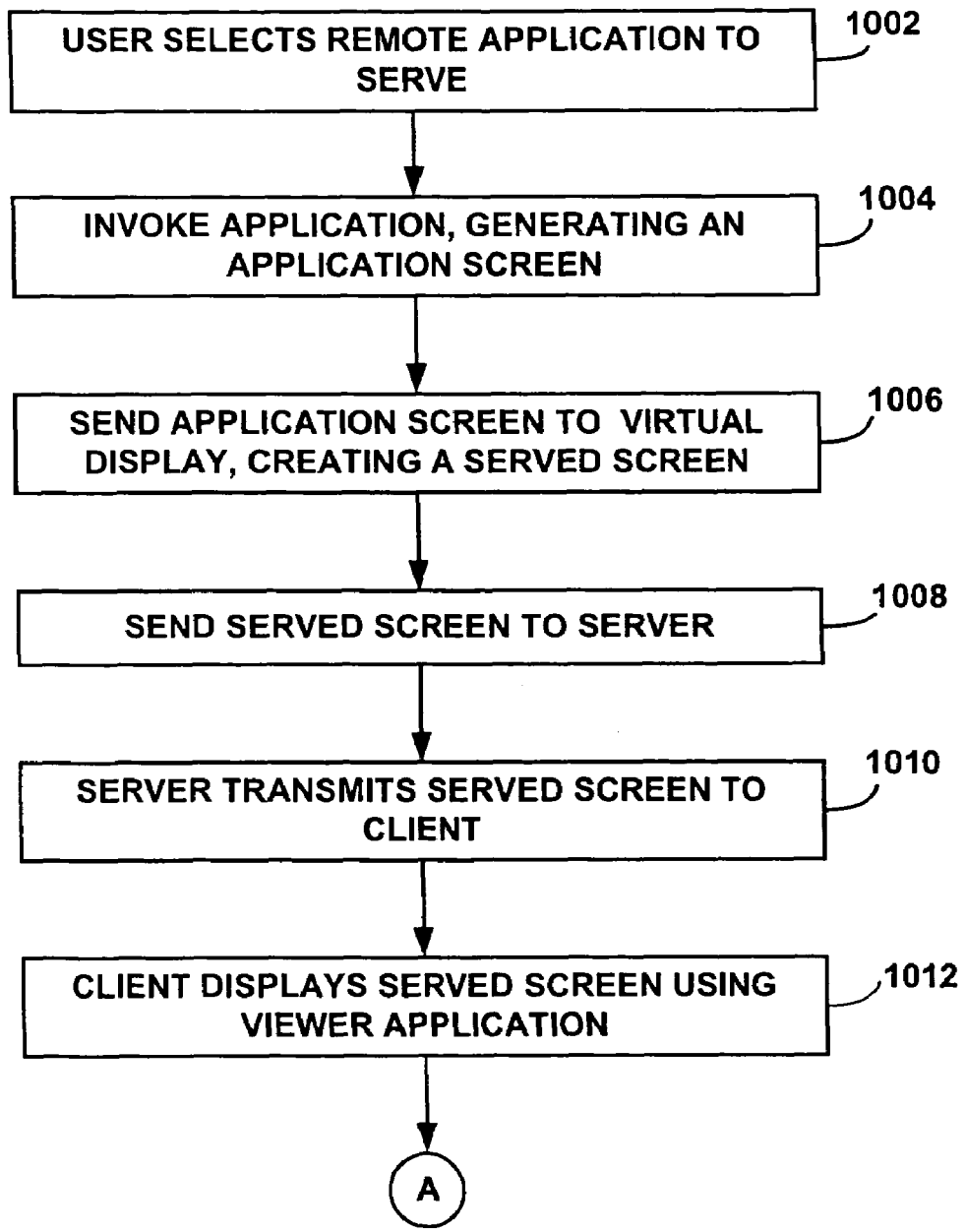
FIGS. 10A and 10B constitute a flowchart depicting the operation of remote application serving mode according to an implementation of the present invention.
Figure 10B:
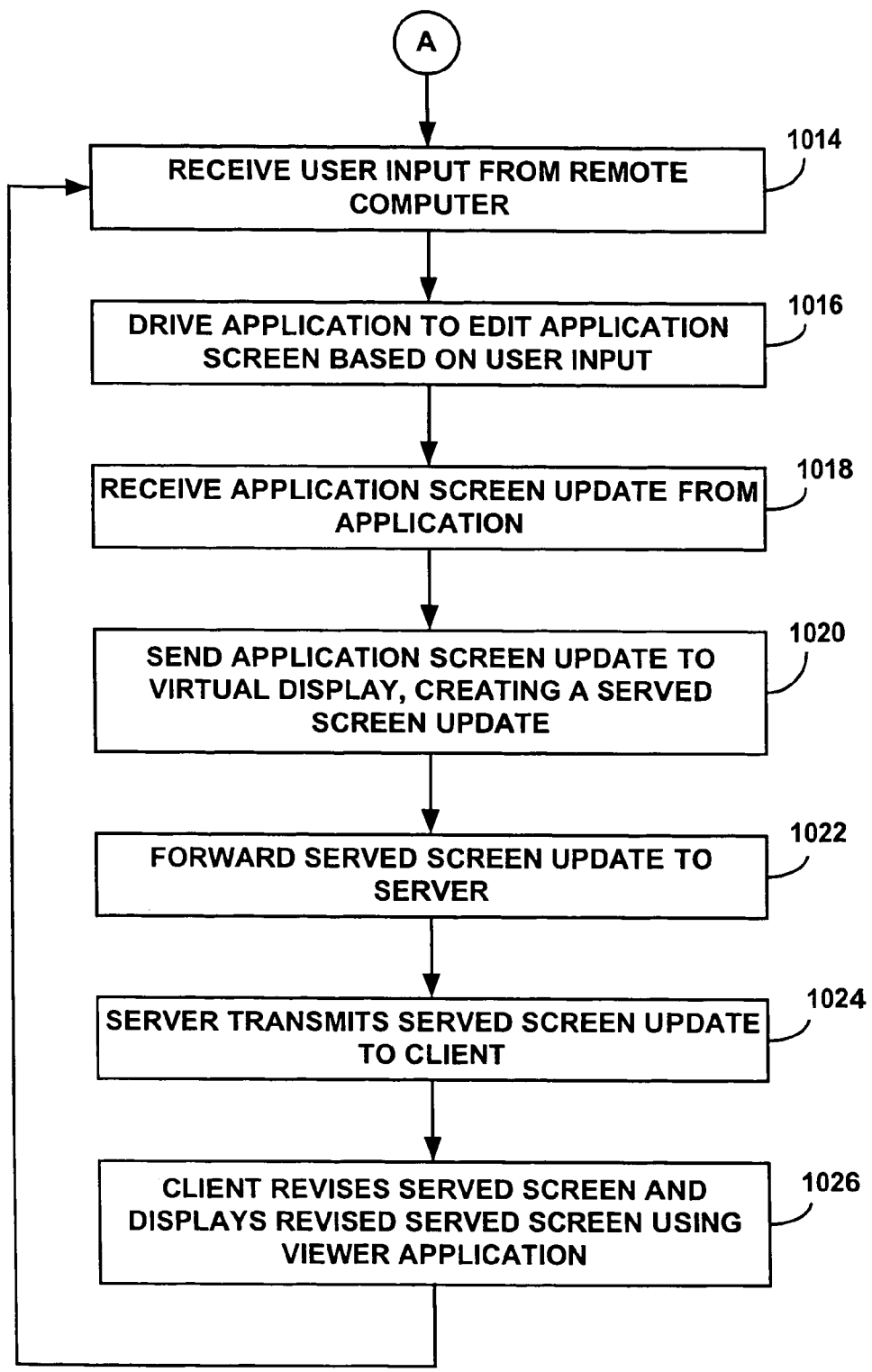

FIG. 9 is a flow diagram depicting an operation of application serving mode according to an implementation of the present invention. FIGS. 10A and 10B constitute a flowchart depicting that operation.

The owner of remote document serving application 210 selects a remote application to view in step 1002. In response, the file editing application is invoked, generating an application screen 902, as shown in step 1004. Server document serving application 216 causes application screen 902 to be sent to virtual display driver 604, thereby generating a served screen 608 as shown in step 1006. The served screen is passed back to server document serving application 216, which sends the served screen to server 102 in step 1008. Server 102 transmits the served screen to the client in the data conference in step 1010. In step 1012, the client in the data conference displays the served screen using viewer application 308.

In application serving mode, the client controls the file editing application directly. Steps 1014 through 1026 illustrate this process. Referring to FIG. 9, a user of client document serving application 210 generates user input 904, which is sent to server document serving application 216 through conferencing server 102. Server document serving application 216 receives the user input in step 1014, and forwards this input to file editing application 212, thereby driving that application to edit the current application screen based on editor user input 904 as shown in step 1016. Server document serving application 216 sends the application screen update to virtual display driver 604, thereby creating a served screen update 610, as shown in step 1020.

The server transmits the served screen update to the client using conferencing server 102, as shown in step 1024. The client revised the current served screen using the served screen update, and displays the revised served screen using its viewer application 308, as shown in step 1026. The process of steps 1014 through 1026 is repeated as needed.

The present invention may be implemented using hardware, software or a combination thereof and may be implemented in a computer system or other processing system. In fact, in one implementation, the invention is directed toward one or more computer systems capable of carrying out the functionality described herein. An example computer system 1100 is shown in FIG. 11. The computer system 1100 includes one or more processors, such as processor 1104. The processor 1104 is connected to a communication bus 1106. Various software implementations are described in terms of this example computer system. After reading this description, it will become apparent to a person skilled in the relevant art how to implement the invention using other computer systems and/or computer architectures.

Computer system 1100 also includes a main memory 1108, preferably random access memory (RAM), and can also include a secondary memory 1110. The secondary memory 1110 can include, for example, a hard disk drive 1111 and/or a removable storage drive 1114, representing a floppy disk drive, a magnetic tape drive, an optical disk drive, etc. The removable storage drive 1114 reads from and/or writes to a removable storage unit 1118 in a well known manner. Removable storage unit 1118, represents a floppy disk, magnetic tape, optical disk, etc. which is read by and written to by removable storage drive 1114. As will be appreciated, the removable storage unit 1118 includes a computer usable storage medium having stored therein computer software and/or data.

In alternative implementations, secondary memory 1110 may include other similar means for allowing computer programs or other instructions to be loaded into computer system 1100. Such means can include, for example, a removable storage unit 1122 and an interface 1120. Examples of such include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1118 to computer system 1100.

Computer system 1100 can also include a communications interface 1124. Communications interface 1124 allows software and data to be transferred between computer system 1100 and external devices. Examples of communications interface 1124 can include a modem, a network interface (such as an Ethernet card), a communications port, a PCM-CIA slot and card, etc. Software and data transferred via communications interface 1124 are in the form of signals, which can be electronic, electromagnetic, optical or other signals capable of being received by communications interface 1124. These signals 1126 are provided to communications interface 1124 via a channel 1128. This channel 1128 carries signals 1126 and can be implemented using wire or cable, fiber optics, a phone line, a cellular phone link, an RF link and other communications channels.

In this document, the terms "computer program medium" and "computer usable medium" are used to generally refer to media such as removable storage device 1118, a hard disk installed in hard disk drive 1112, and signals 1126. These computer program products are means for providing software to computer system 1100.

Computer programs (also called computer control logic) are stored in main memory 1108 and/or secondary memory 1110. Computer programs can also be received via communications interface 1124. Such computer programs, when executed, enable the computer system 1100 to perform the features of the present invention as discussed herein. In particular, the computer programs, when executed, enable the processor 1104 to perform the features of the present invention. Accordingly, such computer programs represent controllers of the computer system 1100.

In an implementation where the invention is implemented using software, the software may be stored in a computer program product and loaded into computer system 1100 using removable storage drive 1114, hard drive 1112 or communications interface 1124. The control logic (software), when executed by the processor 1104, causes the processor 1104 to perform the functions of the invention as described herein.

In another implementation, the invention is implemented primarily in hardware using, for example, hardware components such as application specific integrated circuits (ASICs).

Implementation of the hardware state machine so as to perform the functions described herein will be apparent to persons skilled in the relevant art(s). In yet another implementation, the invention is implemented using a combination of both hardware and software.

While various implementations of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example implementations, but should be defined only in accordance with the following claims and their equivalents.

What is claimed is:

1. A method, comprising:
    invoking an application on an application server, thereby generating an application screen;
    sending the application screen to a virtual display driver, thereby creating a served screen;
    sending the served screen to a remote server for distribution to a remote computer, whereby the served screen is displayed at the remote computer by a viewer application;
    receiving user input from the remote computer; and
    driving the application to edit the application screen based on the user input;
    wherein the remote server comprises a conferencing server, further comprising, if the application server fails, serving the application from another application server via the conferencing server.

2. The method of claim 1, wherein the remote server is a conference server.

3. The method of claim 1, wherein a document serving application of the application server receives the user input from the remote computer.

4. The method of claim 3, wherein forwarding the user input from the document serving application to a file editing application of the application server drives the application to edit the application screen.

5. A system, comprising:
    an application server;
    an application invoker configured to invoke an application on the application server, thereby generating an application screen;
    a document loader configured to send the application screen to a virtual display driver, thereby creating a served screen;
    a communication module configured to send the served screen to a remote server for distribution to a remote computer, whereby the served screen is displayed at the remote computer by a viewer application;
    the application server configured to receive user input from the remote computer;
    and
    the application server configured to edit the application screen based on the user input; and
    a second application server configured to serve the application via the remote server if the application server fails.

6. The system of claim 5, wherein the remote server is a conference server.

7. The system of claim 5, wherein a document serving application of the application server receives the user input from the remote computer.

8. The system of claim 7, wherein forwarding the user input from the document serving application to a file editing application of the application server drives the application to edit the application screen.

* * * * *